Sept. 8, 1953 R. E. HARTSOCK ET AL 2,651,247
PLOW DRAFT DEVICE
Original Filed July 8, 1943
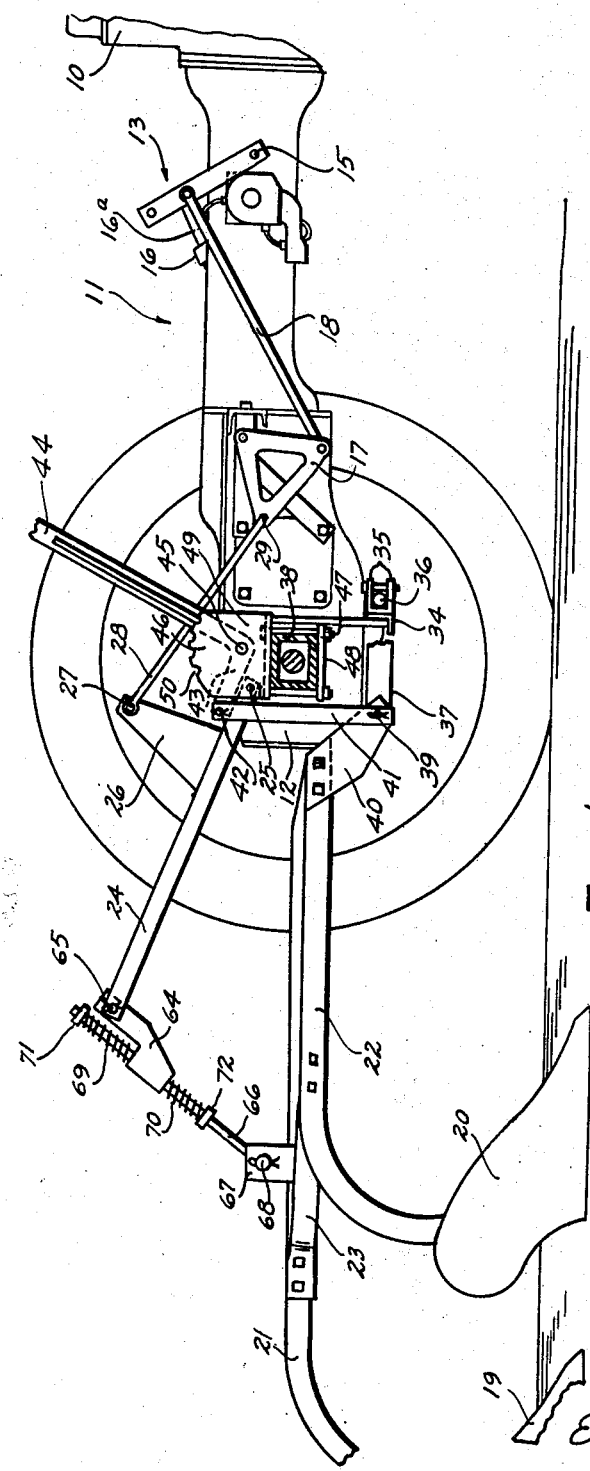
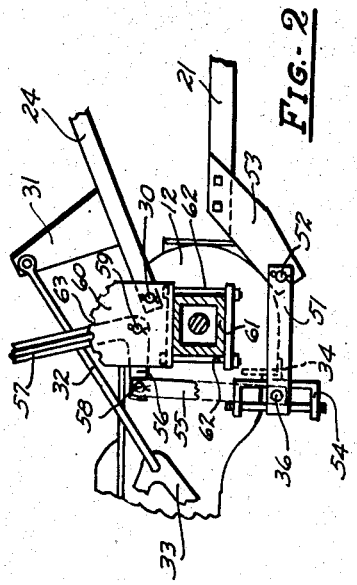
Inventors
ROBERT E. HARTSOCK
RICHARD W. HEISS
Emerson B Donnell
Attorney Patented Sept. 8, 1953

2,651,247

UNITED STATES PATENT OFFICE 2,651,247

PLOW DRAFT DEVICE

Robert E. Hartsock, La Habra, and Richard W. Henss, South Gate, Calif., assignors to J. I. Case Company, Racine, Wis., a corporation of Wisconsin Original application July 8, 1943, Serial No. 493,852, now Patent No. 2,482,751, dated September 27, 1949. Divided and this application September 26, 1949, Serial No. 117,925

2 Claims. (Cl. 97—46.65)

This invention relates to tractors and particularly to the type of machine which carries implements at the rear thereof. This application is a division of application Serial No. 493,852, filed July 8, 1943, now Patent No. 2,482,751, issued September 27, 1949, for Tractor Implements and Control.

Agricultural machines are commonly equipped with mechanism for raising and lowering the tools at the end of the row and for these purposes it has been customary to employ mechanisms at the rear of the tractor including rock shafts, reach rods and the like above and at the sides of the tractor platform. These mechanisms not only encumber the platform and interfere to some extent with the operation and control of the tractor, but also constitute a hazard to the tractor operator since they would be moved with considerable force whenever the power lift mechanism is operated.

The principal object of this invention is to provide an arrangement for mounting a plow or pair of plows at the rear of the tractor, and to provide suitable controls thereto.

Another object is to provide a power lift to operate the controls.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings,

Fig. 1 shows a fragmentary right side elevational view of a tractor embracing the invention;

Fig. 2 is a fragmentary view of the invention showing the left side.

The tractor comprises in general an engine portion 10, a transmission section 11 and a rear axle portion 12 united as is common to form the body of the tractor, and to which are connected the various implements which the tractor is to propel.

The present invention deals with implements which will be carried by the tractor and which may be raised and lowered and incidental to this function a yoke member generally designated as 13 is pivotally mounted preferably astride a mid portion 11 on pintles 15—15, so as to be rockable fore-and-aft for controlling the position of the implements.

Yoke 13 is preferably rocked by power derived from the tractor engine, and for this purpose a hydraulic cylinder 16 is pivotally mounted on mid portion 11 and has a ram 16a acting forwardly on a pivot carried by yoke 13. Fluid for actuating the ram 16 may be obtained in the well known manner by use of a suitable pump and need not be further described.

The present invention concerns the mounting of plows and their operation, and such arrangement will now be described. A bell crank 17 is mounted on mid portion 11 and which connects in turn with yoke member 13 by a link 18 as shown in Fig. 1.

In the present instance the tractor carries and actuates plows including share portions 19 and 20 carried by beams 21 and 22. These beams are spaced apart by a spreader 23, the assemblage being drawn by the tractor and lifted when necessary by means of a lifting arm 24. Arm 24 is pivoted at 25 on the tractor and has an upstanding arm 26 pivotally connected at 27 with link 28 connected at 29 with above mentioned bell crank 17. Yoke 24 is preferably bifurcated and as shown in Fig. 2, also pivoted at 30 having an upstanding arm 31 connected in similar manner by a link 32 with a bell crank 33. It will therefore be apparent that swinging of yoke 13 will raise or lower yoke 24 thus lifting or lowering plows 19 and 20.

Returning to a more detailed description of the plows, a fitting or cross bar 34 is bolted or otherwise solidly fixed with axle portion 12 and has a bifurcated portion 35 in which is received a torsion shaft 36. Shaft 36 has a rearwardly extending arm 37 extending beneath axle portion 38 and pivotally connected at 39 with a fitting 40 connected with above mentioned beam 22. Pivot 39 is adjustable up and down with rocking of shaft 36 by means of a link 41 connected at 42 with an arm 43 of a lever 44 fulcrumed at 45 on a plate 46. Plate 46 constitutes a clamping portion fixed on axle portion 38 by bolts 47 engaging a clamping portion 48 engaged beneath axle portion 38. Plate 49 has a quadrant portion 50 to which lever 44 may be engaged and also supports above mentioned pivot 25. Adjusting of lever 44 raises or lowers pivot point 39 which changes the depth of operation of share 20 in a manner well understood.

Rocking of shaft 36 as better seen in Fig. 2 rocks an arm 51 fixed on shaft 36 and pivoted at 52 to a fitting 53 carried on above mentioned beam 21. Pivot point 52 is therefore raised and lowered in coincidence with pivot point 39 by the action of lever 44 so that plow share 19 is adjusted along with share 20. Lever 44 therefore adjusts the plowing depth of both shares.

As is well known, the tractor ordinarily runs with one wheel in the furrow, which gives it a substantial tilt to one side. The amount of this tilt will change with changes in the depth of plowing. Since it is desirable that the plows themselves shall run level, an adjustment is provided to accommodate this tilting of the tractor without corresponding tilting of the plow. In the present instance yoke 54 is fixed with above mentioned bar 34 and in which is engaged above mentioned shaft 36, yoke 54 being disposed in the present instance on the left side of the tractor on the side opposite to above mentioned bifurcated portion 35. At this point shaft 36 is connected by a link 55 to an arm 56 of a lever 57 by means of a pivot 58. Lever 57 is fulcrumed at 59 in a plate 60 similar in character to plate 49. Plate 60 is clamped to axle portion 61 by bolts 62—62 and carries above mentioned pivot 30. Plate 60 also has a quadrant portion 63 for retaining lever 57 in desired adjustment. As will be apparent, shifting of lever 57 will raise or lower the left end of shaft 36 and accordingly vary the angle between the tractor and the assemblage constituted by beams 21, 22 and spreader 23.

Yoke 24 is connected by means of a slide fitting 64 pivoted at 65, and a rod 66 with a lug 67 by means of a pivot 68. Lug 67 is carried by above mentioned spreader 23 and constitutes the means through which yoke 24 raises beams 21 and 22. Rod 66 slides through fitting 64 and has springs 69 and 70 engaging abutments 71 and 72 on the rod 66 for yieldably maintaining rod 66 in predetermined relation to yoke 24. Thus plows 19 and 20 are free to rise and fall to a certain extent so as to follow the inequalities of the ground but are controlled somewhat by springs 71 and 72 to promote steady running. It will thus be apparent that plows 19 and 20 are carried and operated by the tractor and which plows may be raised and lowered by mechanism mounted on the tractor.

What is claimed as new and desired to be secured by Letters Patent of the United States is:

1. In a tractor having a longitudinal body portion and a transverse rear axle, a transverse draft member, supported on said rear axle on the forward side thereof for oscillating pivotal movement, and said draft member being also arranged for up-and-down displacement at one end, a rearwardly extending arm fixed at one end of said draft member and extending rearwardly of said rear axle, a plow beam pivotally attached to said arm to be drawn thereby, a second rearwardly extending arm fixed at the other end of said draft member and extending rearwardly of said rear axle, and a second plow beam pivotally connected to said second rearwardly extending arm, plows on said beams, a depth adjusting lever mounted on the tractor and a connection therefrom to the pivotal connection between the first mentioned arm and plow beam, a level adjusting lever mounted on the tractor and a connection to the end of said draft member remote from the first mentioned arm for displacing said member up-and-down for leveling the plow beams relatively to the tractor, a yoke journaled for fore-and-aft rocking movement at the mid-portion of the tractor, a power lift element connected with the yoke for rocking the same at will, a lifting element pivotally connected to the tractor and extending rearwardly over said plow beams and connected for lifting said beams upon rocking of said lifting element, and a connection from said yoke to said lifting element for rocking it in response to rocking of said yoke.

2. In a tractor having a longitudinal body portion and a transverse rear axle, a transverse draft member supported on said rear axle on the forward side thereof, for oscillating pivotal movement, a rearwardly extending arm on said draft member and extending rearwardly of said rear axle, a plow beam pivotally connected to said arm rearwardly of said rear axle and extending rearwardly therefrom, a plow on said plow beam, a depth adjusting lever mounted on the tractor and a connection therefrom to the pivotal connection between said plow beam and said rearwardly extending arm for oscillating said draft member in response to actuation of said lever, a yoke pivotally connected to the mid-portion of the tractor for fore-and-aft rocking movement, means connected with said yoke for rocking it at will, a lifting element pivotally connected to the tractor and extending rearwardly over the plow beam, a connection from the lifting element to the plow beam for lifting the latter upon rocking of the lifting element, and a connection from said yoke to said lifting element for rocking the latter in response to rocking of said yoke.

ROBERT E. HARTSOCK.
RICHARD W. HENSS.

References Cited in the file of this patent

UNITED STATES PATENTS

| Number | Name | Date |
|---|---|---|
| 1,505,201 | Johnson | Aug. 19, 1924 |
| 2,207,087 | Chaney | July 9, 1940 |
| 2,222,115 | Mott | Nov. 19, 1940 |
| 2,309,221 | Smith | Jan. 26, 1943 |
| 2,482,751 | Hartsock et al. | Sept. 27, 1949 |